United States Patent
Spicer et al.

(10) Patent No.: US 8,701,748 B2
(45) Date of Patent: Apr. 22, 2014

(54) OUTLET FITTING FOR DOUBLE PIPE QUENCH EXCHANGER

(75) Inventors: Dave B. Spicer, Houston, TX (US); Nicholas G. Vidonic, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1398 days.

(21) Appl. No.: 11/356,475

(22) Filed: Feb. 17, 2006

(65) Prior Publication Data

US 2007/0193729 A1    Aug. 23, 2007

(51) Int. Cl.
  F28F 19/00    (2006.01)
  F28F 7/00     (2006.01)
  F28D 7/00     (2006.01)

(52) U.S. Cl.
  USPC ................ 165/134.1; 165/81; 165/154

(58) Field of Classification Search
  USPC ........................... 165/134.1, 81, 154
  See application file for complete search history.

(56) References Cited

U.S. PATENT DOCUMENTS

| | | | |
|---|---|---|---|
| 3,583,476 A | 6/1971 | Woebeke et al. | 165/1 |
| 3,610,330 A * | 10/1971 | Nasser | 165/158 |
| 4,400,019 A * | 8/1983 | Fruck | 285/55 |
| 4,457,364 A | 7/1984 | DiNicolantonio et al. | 165/134 R |
| 5,464,057 A * | 11/1995 | Albano et al. | 165/173 |
| 5,690,168 A | 11/1997 | Cizmar et al. | 165/134.1 |
| 5,732,981 A | 3/1998 | Brucher et al. | 285/41 |
| 6,148,908 A | 11/2000 | Brucher | |
| 2006/0267340 A1 * | 11/2006 | Galatello Adamo et al. | 285/288.1 |

FOREIGN PATENT DOCUMENTS

DE    3910630 A1    10/1990
DE    19531330 A1   2/1997

OTHER PUBLICATIONS

Fraas, Arthur P., Heat Exchanger Design, 1965, John Wiley & Sons Inc., pp. 36 and 37.*

* cited by examiner

Primary Examiner — Brandon M Rosati

(57) ABSTRACT

A novel outlet fitting for use in connection with a heat exchanger. The heat exchanger is used in the role of a quench exchanger for cooling cracking effluent and solves particular problems associated with gas-oil cracking applications and other heavy feed based applications wherein differences between process outlet temperature and coolant temperatures are larger than in, for example, naphtha and gas cracking applications. The specific solution is achieved through a novel outlet fitting for the quench exchanger that eliminates the need for a steam purge, addresses thermal stress issues and reduces pressure drop within the system. The outlet fitting includes internal insulation to avoid the need for a steam purge. In addition, the outlet fitting includes a low-angle diffuser with an angle of less than 7 degrees and preferably less than 5 degrees.

22 Claims, 3 Drawing Sheets

OUTLET FITTING FOR DOUBLE PIPE QUENCH EXCHANGER

FIELD OF THE INVENTION

The present invention relates generally to heat exchangers and more particularly to a quench heat exchanger outlet fitting suitable for applications in which there exist high thermal stresses.

BACKGROUND OF THE INVENTION

The production of ethylene requires a number of process steps through which any of a variety of hydrocarbon feeds can be refined to generate various products including ethylene. The predominate process for producing ethylene is steam cracking. According to this process, hydrocarbon feed is heated in cracking furnaces and in the presence of steam to high temperatures. It is well known in the industry that shorter residence times within the furnaces results in a desirable selectivity to ethylene.

As such, once the desired conversion of feed has been achieved, the process gas must be rapidly cooled, or quenched, to minimize undesirable continuing reactions that are known to reduce selectivity to ethylene. The vast majority of ethylene furnaces currently in use employ so-called "transfer-line-exchangers" (TLEs), also referred to as "quench exchangers" or "quench coolers", for this purpose. These devices are heat exchangers that rapidly cool the process gas by generating steam. The resulting steam is typically generated at high pressures (e.g. 600-2000 psig).

Many of the TLEs in service employ a double pipe or double tube construction with the high temperature cracking furnace effluent introduced into the interior pipe, with a cooling medium such as water being introduced into the annular space between the two tubes. Double pipe exchangers may be configured as bundles or as so-called "linear" units. The advantage of the linear type units is that the adiabatic time between the furnace outlet and the cooling tube inlet can be minimized to allow enhanced ethylene selectivity. Linear units also benefit from the lack of a tubesheet area which would otherwise be exposed to the hot process gas and are thus subject to various mechanical and erosion concerns. Further, in linear units, the process flow is more evenly distributed among the cooling tubes.

One key component in the linear double pipe exchanger design is the inlet fitting. This fitting must accommodate the thermal stresses generated by the large temperature difference between the process gas [typically 1500-1950° F. (810-1060° C.)] and the coolant filled double pipe unit [typically 450-650° F. (230-340° C.)] as are typically present at the inlet. A direct coupling of these components generates high thermal stresses and would be expected to suffer mechanical failure in a relatively short period of time.

U.S. Pat. No. 3,583,476 to Woebcke et al. describes an early fitting design for a gas cooling heat exchanger employing a two-stage diffuser component. The disclosed device requires the use of a steam purge or steam seal to seal the annular passage. Steam purges are undesirable as they require additional condensing capacity in downstream processing units. Another drawback to steam-purged designs is that inevitably some wet steam enters the exchanger reducer area and causes locally high thermal stresses that can lead to cracking of the material.

U.S. Pat. No. 4,457,364 to Dinicolantonio et al. discloses the use of a refractory filled reducer to better manage the thermal stresses inherent in the process without the use of a steam purge. Other examples of improved designs for quench inlet connectors include the exchangers disclosed in U.S. Pat. No. 5,690,168 to Cizmar et al. and in German Patent 195 31 330 C2 to Brucher et al.

Generally, inlet fittings do not require a significant change in process gas tube diameter. Because low residence time is preferred in the furnace design, high velocities are also desirable. High velocities generate a high heat transfer coefficient in the quench cooler. Thus, both the heat exchanger and the furnace outlet require high velocity and, thus, the inlet connector need not generally manage any significant diameter changes between these two components.

It is also known that selectivity to ethylene is favored by low pressure in the furnace. Thus, a quench exchanger with a lower pressure drop arrangement is preferred. The Woebcke device comprises a quench exchanger that minimizes pressure drop through the use of diffuser sections. However, as referenced above, these diffuser sections require the use of slip joints and steam purges resulting in the aforementioned undesirable impacts on downstream units.

As discussed above, quench exchanger inlet fittings have received a good amount of attention towards the general goal of process improvement and increased efficiency. In contrast, outlet fittings for quench exchangers have received much less attention. In naphtha and gas cracking, the most common feeds used in ethylene production, it is possible to design quench exchangers with process outlet temperatures in the range of 550-750° F. (290-400° C.). This greatly reduces thermal stress issues since the cooling tube temperatures are correspondingly in the range of 450-650° F. (230-340° C.). Because of this near uniformity in temperature, no reducer profile is required in the outlet fitting since thermal stresses are relatively small. Further, the Woebcke device also allows a simple transition from a small diameter cooling tube (sized to give a good heat transfer coefficient) and a larger diameter outlet pipe sized to provide a low pressure drop.

While connectors such as that disclosed in the Woebcke reference have proved robust for applications such as naphtha and gas cracking, where process outlet and coolant temperature differences are small [e.g. less than 200° F. (90° C.)], the same environment does not exist for gas-oil cracking applications as well as a number of other applications with heavy feeds wherein high quench exchanger process outlet temperatures exist. While it is possible to modify the Woebcke design to handle gas-oil and other heavy feed applications, its still requires the steam purge with its attendant drawbacks as previously noted. When employed in gas-oil cracking and other heavy feed applications, quench exchangers experience a much greater outlet temperature rise (e.g. to 650° C./1200° F. or higher) than would be the case in other applications such as naphtha or gas cracking. With this, come the various mechanical issues resulting from the high temperature gradient.

The Woebcke device addresses the thermal stress issues as well as pressure drop issues through the use of a slip-joint/steam-purge/diffuser combination at the downstream end of the quench exchanger. However, this arrangement increases the condensing load on downstream processing units and adds to the cost of the installation by requiring the supply and connection of a steam supply to each double pipe unit. Since a large, modern furnace may employ over 100 double pipe units, the cost for the steam supply can be prohibitive. This design also introduces the potential to introduce wet steam into a component operating at up to 1200° F. (650° C.), and thus generates high local thermal stresses which can eventually crack the component.

SUMMARY OF THE INVENTION

It is therefore a primary object of the present invention to provide a system and methodology which improves upon prior art systems and methodologies and their related drawbacks as described above.

It is another object of the present invention to provide a heat exchanger device for use in cracking applications and other applications with high outlet temperatures which does not suffer from thermal stress and erosion related problems.

It is a further object of the present invention to provide an outlet fitting for a quench exchanger which minimizes problems resulting from thermal stress and erosion in an environment with large temperature differentials.

It is a still further object of the present invention to provide such an outlet fitting for use with a "linear" type quench heat exchanger.

It is yet another object of the present invention to provide a quench exchanger in combination with a quench outlet fitting that offers both efficient heat transfer and minimal pressure drop.

It is an even further object of the present invention to provide such an outlet fitting which offers the above stated advantage without the necessity for a steam purge.

These and other objects of the present invention are obtained through the use of a novel outlet fitting for a linear type quench heat exchanger which may be employed in a cracking process and has particular application for gas-oil cracking processes as well as other heavy feed applications. Through the use of this novel outlet fitting, failures related to thermal stressing and erosion due to the large temperature differences among adjacent components can be successfully minimized and/or eliminated.

These and other advantages and features of the present invention are described herein with specificity so as to make the present invention understandable to one of ordinary skill in the art.

DETAILED DESCRIPTION OF THE INVENTION

The present invention for a novel heat exchanger and related outlet fitting is now described in specific terms sufficient to teach one of skill in the art to practice the invention herein. In the description that follows, numerous specific details are set forth by way of example for the purposes of explanation and in furtherance of teaching one of skill in the art to practice the invention. It will, however, be understood that the invention is not limited to the specific embodiments disclosed and discussed herein and that the invention can be practiced without such specific details and/or substitutes therefor. The present invention is limited only by the appended claims and may include various other embodiments which are not particularly described herein but which remain within the scope and spirit of the present invention.

Figure 1:
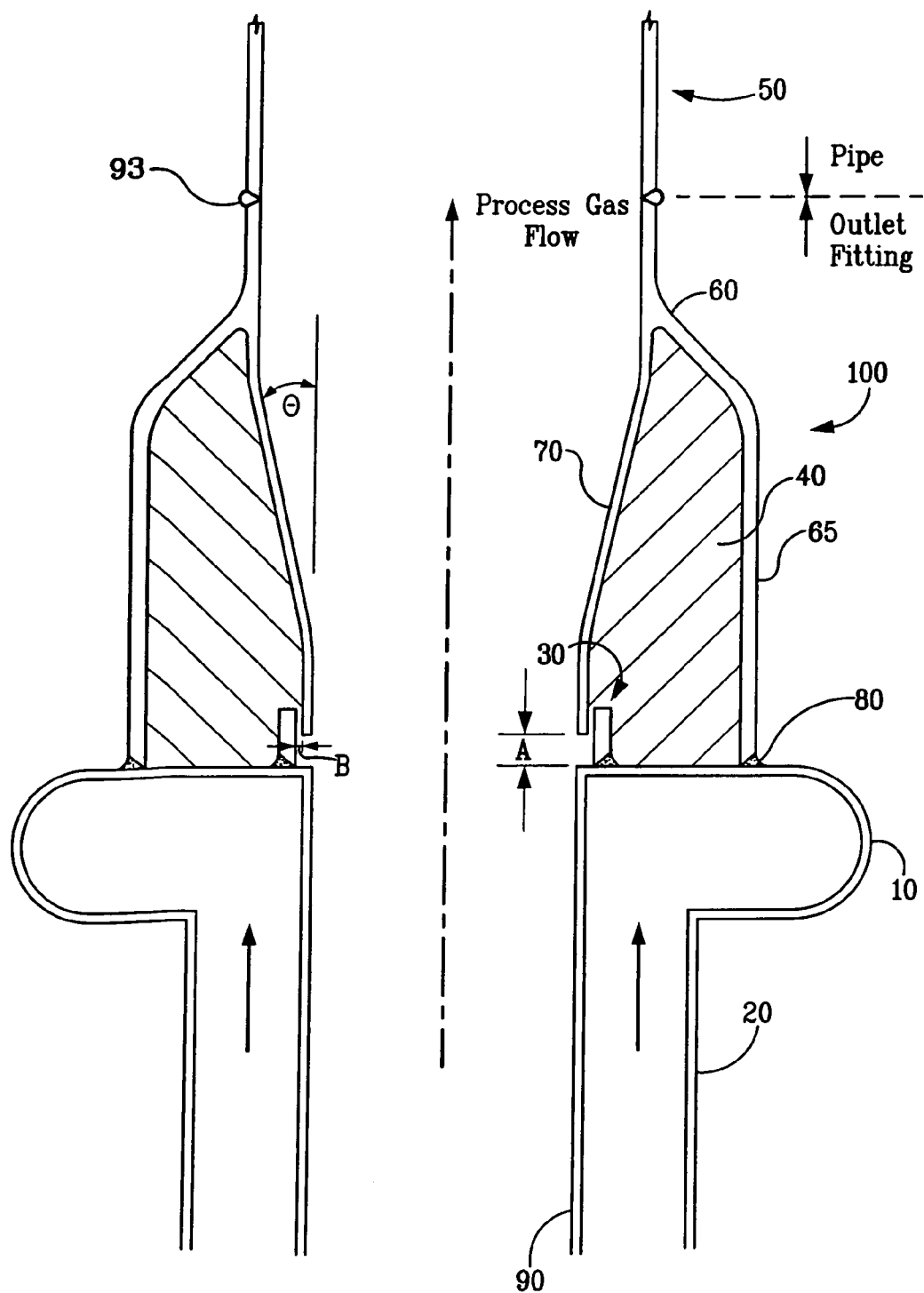
FIG. 1 is a schematic diagram of the quench exchanger outlet fitting of the present invention in a preferred embodiment thereof.

FIG. 1 is a schematic diagram of the quench exchanger outlet fitting of the present invention in a preferred embodiment thereof. As can be seen from that figure, outlet fitting 100 is attached to coolant tube 10 at the downstream end of coolant tube 10. Coolant tube 10 includes an inner tube portion 90 through which process gases flow and an outer tube portion 20 through which a cooling gas or liquid flows. In a preferred embodiment, the coolant is a saturated boiler feed water which may comprise high quality treated water suitable for generation of steam or a steam mixture.

Figure 2:
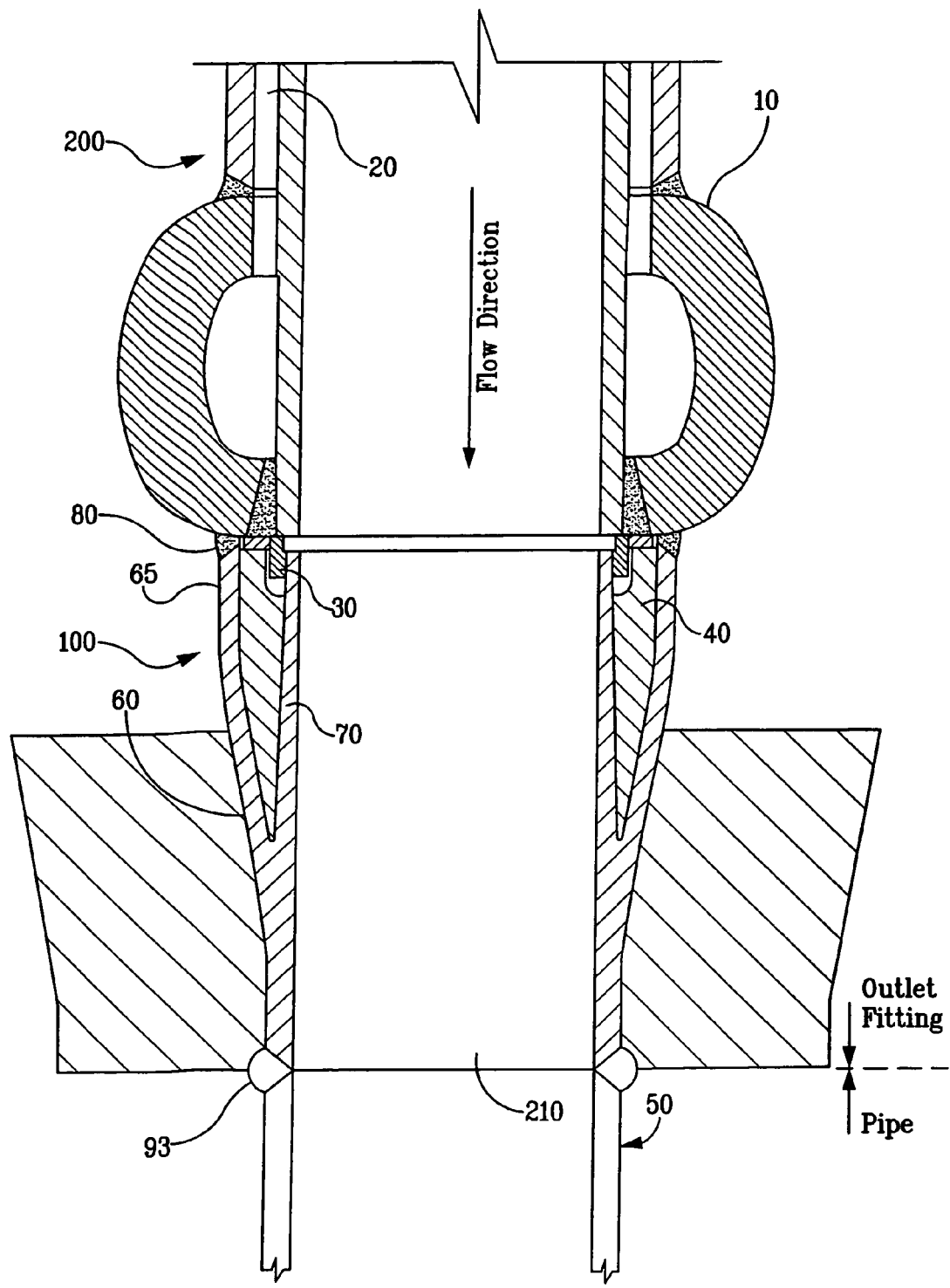
FIG. 2 is a schematic diagram of a heat exchanger design incorporating the outlet fitting shown in FIG. 1.

Outlet fitting 100 is also shown in FIG. 2 as a component of heat exchanger 200 including coolant tube 10 and outlet pipe 210. Heat exchanger 200 with outlet fitting 100 has particular application to steam cracking processes including those involving the generation of ethylene from gas-oil and other heavy hydrocarbon feedstocks because these gas-oil applications and other heavy feed applications involve particularly high temperature differentials between the process outlet gas and the coolant tube 10. Further, according to the present invention, resulting thermal stresses are managed without the need for a steam purge and its related drawbacks.

The teachings of the present invention have particular application to processes with high outlet temperatures. This includes, by way of example and not limitation, gas-oil cracking applications, other heavy feed applications including atmospheric and vacuum gas-oils as well as virgin and hydro-treated gas-oils (to include both mildly hydro-treated gas-oils and severely hydro-cracked gas-oils). Other feeds may include, for example, crude oil and crude oil fractions from which non-volatile components have been removed. Further, the invention has particular application to feeds comprising field condensates with high final boiling points [e.g. above 600° F. (310° C.)].

Outlet fitting 100 employs a reducer external profile to manage thermal stresses resulting from the large temperature differential between the process outlet gas [up to 1250° F. (680° C.)] and the coolant tube [typically at 450-650° F. (230-340° C.)]. Outlet fitting 100 is also internally insulated using insulating material 40 so as to avoid the problems typically associated with steam purges. In a preferred embodiment of the invention, the insulating material is a castable refractory such as Thermal Ceramic's Kao-Tuff C. Alternatively, other suitable materials may be used as will be known by those skilled in the art.

Inner element 70 of outlet fitting 100 preferably takes the form of a low-angle diffuser in order to provide a transition between the high velocity coolant tube 10 and the lower velocity outlet piping element 50. Weld 93 attaches outlet fitting 100 to the lower velocity outlet piping element 50. The process outlet piping element 50 preferably comprises piping of a standard NPS pipe size which is particularly suited to match the diameter of outlet fitting 100 at its downstream end. A diffuser angle (theta θ as shown in FIG. 1) of less than 7 degrees is preferred to avoid flow separation and permit pressure recovery within the diffuser. In an even more preferable embodiment, a diffuser angle theta (θ) of 5 degrees or less is used.

Inner element 70 of outlet fitting preferably stops short of the face surface of coolant tube 10 as shown in the figure. Gap A (see FIGS. 1 and 3) is sized to allow inner element 70 to heat up to, for example, approximately 1250° F. (680° C.), and allow for the associated thermal expansion, without the end of inner element 70 coming-into contact with coolant tube assembly 10. In a preferred embodiment of the present invention, gap A may be sized at, for example, 0.10 inches. This allows for gap A to essentially close when a temperature of approximately 1300° F. (700° C.). As will be apparent to one of skill in the art a different sized gap A may be used depending upon the application, the material from which outlet fitting 100 is formed and the particular process. However, in a preferred embodiment, it is preferable that gap A be essentially reduced to zero at the maximum temperature expected for the process outlet gas. If gap A is too small, the inner liner of the reducer will contact the cooling tube as the reducer heats up. This can lead to failures of the reducer. If the gap A is too great, the process gas flowing past the gap is disturbed, forming eddies that can lead to excessive coke deposits being formed.

In a preferred embodiment of the present invention outlet fitting 100 is attached to coolant tube 10 via a weld 80 between the upstream end of the exterior portion 65 of outlet fitting 100 and coolant tube 10. The overall length of outlet fitting 100 is a geometric function of the inside diameter of coolant tube 10, the process outlet tube inside diameter, and the diffuser angle theta ($\theta$). The bigger the difference between the two diameters, the longer the fitting. This gives the best trade off between pressure recovery (longer diffusers) and cost (shorter reducers).

Outlet fitting 100 may be constructed from any material suitable for service at the maximum process outlet temperature of the quench cooler. For gas-oil cracking and other heavy feed applications, where the outlet temperatures may rise to 1250° F. (680° C.) or more, austenitic stainless steels are preferred. Two possible compositions include 18-chromium/8-nickel/balance-iron (type 304 stainless steel) and 20-chromium/32-nickel/balance-iron (Alloy 800). The outlet fitting 100 of the present invention may be manufactured by either casting or forging processes. According to a preferred embodiment of the present invention, the surfaces of the fitting are machined to precisely achieve the desired geometrical shape.

Various embodiments for fitting 100 of the present invention are possible including those with inner diameters as small as 1 inch and as large as 8 inches. Larger and smaller diameters may also be possible. The coolant tube 10 inside diameter is determined by the heat exchanger design. This in turn is often a function of the furnace design. For example, the exchanger tube inside diameter may range from 1.5-3.5 inches, although occasionally a smaller (e.g. down to 1.0") or larger (e.g. up to 6.0") inside diameter is used. Obtaining good heat exchange coefficients and minimizing exchanger length (and thus cost) favors smaller diameters, and obtaining low pressure-drop favors larger diameters. Additionally, the exchanger tubes are usually manufactured to standard tubing size ranges. The outlet pipe is designed to provide minimum pressure drop at reasonable cost. Thus it will normally be a larger diameter than the exchanger tube. Typically, the outlet pipe is selected from a standard pipe size (eg: NPS). Within these guidelines there are numerous combinations of diameters from which may be used.

A preferred, but optional, feature of the outlet fitting 100 of the present invention is the use of centering ring 30 which is connected to coolant tube 10. Centering ring 30 may be welded to coolant tube 10 in the same way as exterior portion 65 of outlet fitting as described above. According to this embodiment, centering ring 30 guides the inner element 70 of outlet fitting 100 as it heats up and expands. A radial gap, identified in FIGS. 1 and 3 as gap B, is provided between the inner element 70 of outlet fitting 100 and centering ring 30 to allow inner element 70 to expand without contacting centering ring 30. In a preferred embodiment, gap B may be approximately 0.04 inches. The desired gap size is such that the gap becomes very small when the inner liner of the reducer reaches its maximum temperature [often set at 1300° F. (700° C.) as previously noted]. Centering ring 30 is kept cool by conduction from cooling tube 10, to which it is welded. The desired gap is preferably determined by the outside diameter of the reducer inner liner and its maximum operating temperature, from which the radial expansion of the reducer's inner liner can be calculated.

Centering ring 30 provides the following advantages: (i) ensuring that when making the weld between the outer diameter of the reducer and coolant tube 30 the inner liner of the reducer is aligned with coolant tube 30, and (ii) preventing refractory material which is used to fill the reducer from obstructing the gap between the inner liner of the reducer and the end of coolant tube 30.

Figure 3:
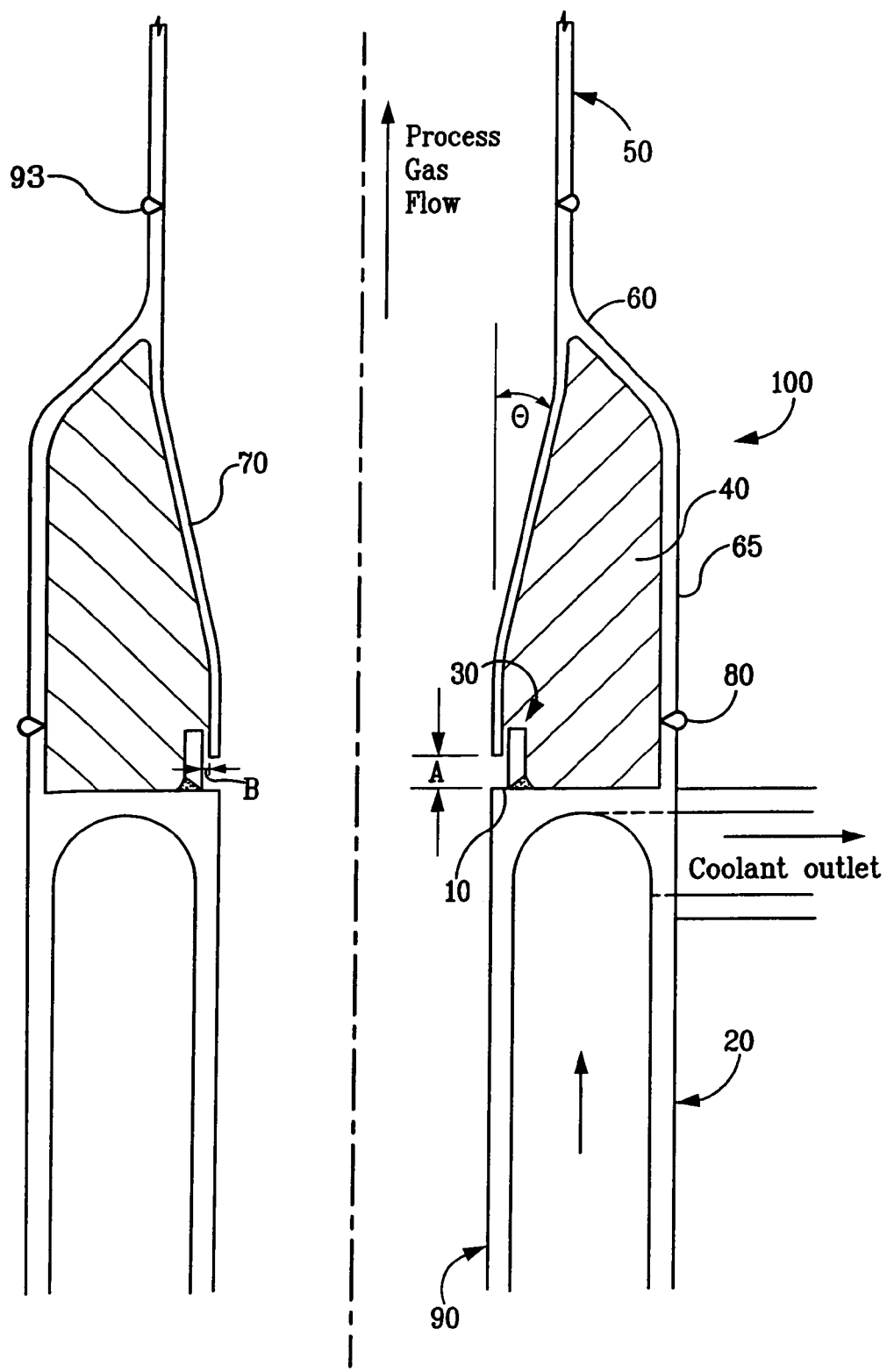
FIG. 3 is a schematic diagram of an alternative heat exchanger design incorporating the outlet fitting of the present invention.

FIG. 3 illustrates another embodiment of the present invention in which the outlet fitting described herein is used in combination with an alternative TLE design. In this case, the TLE does not include the oval header of the FIG. 1/FIG. 2 TLE design. As can be seen in FIG. 3, the components of outlet fitting 100 remain the same as with the previously described embodiment. However, in this case, weld 80 is in a different location in view of the lack of an oval header in this embodiment. As in the FIG. 1/FIG. 2 embodiment, weld 80 in the FIG. 3 embodiment connects outlet fitting 100 to coolant tube 10.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

What is claimed is:

1. An outlet fitting for a double-pipe heat exchanger, said heat exchanger comprising a coolant tube and a process gas flow passage, said outlet fitting comprising an inlet portion, an outlet portion, and an inner element in the form of a low angle diffuser extending and expanding in cross-section between said inlet portion and said outlet portion, and a linear thermal expansion portion at the inlet portion consisting of a gap (A) between said inner element and said coolant tube to allow for thermal expansion of said coolant tube and said inner element when in the presence of heated process gas, said gap (A) effective to avoid both inner element contact with said coolant tube and formation of eddies, wherein said outlet fitting is configured to pass said process gas from said double-pipe heat exchanger to an outlet pipe, an outer element attached to said inner element at a first end of said outer element downstream of said coolant tube, said outer element further being rigidly attached to said coolant tube at a second end of said outer element.

2. The outlet fitting of claim 1, wherein said gap (A) is effective to avoid inner element contact with said coolant tube when heated to approximately 1250° F. (680° C.).

3. The outlet fitting of claim 1, wherein the maximum angle, theta, of said low angle diffuser with respect to a line represented by a linear extension of an inner surface of said coolant tube is less than 7 degrees.

4. The outlet fitting of claim 3, wherein said maximum angle, theta, is less than 5 degrees.

5. The outlet fitting of claim 1, further comprising a centering ring connected to said coolant tube, said centering ring functioning to constrain the movement of said outlet fitting during heating, and a radial thermal expansion portion at said inlet portion consisting of a radial gap (B) between said inner element and said centering ring.

6. The outlet fitting of claim 5, wherein said radial gap (B) is effective to avoid inner element contact with said centering ring when heated by said process gas.

7. The outlet fitting of claim 1, wherein said double-pipe heat exchanger is used to cool process gases resulting from a hydrocarbon cracking process.

8. The outlet fitting of claim 1, wherein said double-pipe heat exchanger is used to cool process gases resulting from a cracking process employing a heavy hydrocarbon feed.

9. The outlet fitting of claim 8, wherein said double-pipe heat exchanger is used to cool process gases resulting from a process employing a crude oil feed from which non-volatile components have been removed.

10. The outlet fitting of claim 8, wherein said double-pipe heat exchanger is used to cool process gases resulting from a gas-oil cracking process.

11. The outlet fitting of claim 1, wherein said outlet fitting is formed from austenitic stainless steel.

12. The outlet fitting of claim 1, wherein said outlet fitting is formed from Type 304 stainless steel.

13. The outlet fitting of claim 1, wherein said outlet fitting is formed from Alloy 800.

14. The outlet fitting of claim 1, wherein said outlet fitting is formed from a cast metal.

15. The outlet fitting of claim 1, wherein said outlet fitting is formed from a forged metal.

16. A double-pipe heat exchanger comprising:
   (a) a coolant tube;
   (b) a process flow gas passage centered within said coolant tube; and
   (c) an outlet fitting, wherein said outlet fitting comprises an inlet portion, an outlet portion, and an inner element in the form of a low angle diffuser extending and expanding in cross-section between said inlet portion and said outlet portion, and a linear thermal expansion portion at said inlet portion consisting of a gap (A) between said inner element and said coolant tube exists to allow for thermal expansion of said coolant tube and said inner element when in the presence of heated process gas said gap (A) effective to avoid both inner element contact with said coolant tube and formation of eddies, wherein said outlet fitting is configured to pass said process gas from said double-pipe heat exchanger to an outlet pipe, wherein the maximum angle, theta, of said low angle diffuser with respect to a line represented by a linear extension of an inner surface of said coolant tube is less than 7 degrees.

17. The heat exchanger of claim 16, wherein said gap (A) is effective to avoid inner element contact with said coolant tube when heated to approximately 1250° F. (680° C.).

18. The heat exchanger of claim 16, wherein said maximum angle, theta, is less than 5 degrees.

19. The heat exchanger of claim 16, wherein said outlet fitting further comprises a centering ring connected to said coolant tube, said centering ring functioning to constrain the movement of said outlet fitting during heating, and a radial thermal expansion portion at said inlet portion consisting of a radial gap (B) between said inner element and said centering ring.

20. The heat exchanger of claim 19, wherein said radial gap (B) is effective to avoid inner element contact with said centering ring when heated by said process gas.

21. The heat exchanger of claim 16, wherein said heat exchanger is used to cool process gases resulting from a hydrocarbon cracking process.

22. In a system for the production of ethylene, the system comprising an ethylene furnace and a double-pipe heat exchanger, the double-pipe heat exchanger comprising:
   (a) a coolant tube;
   (b) a process flow gas passage centered within said coolant tube; and
   (c) an outlet fitting,
wherein said outlet fitting comprises an inlet portion, an outlet portion, and an inner element in the form of a low angle diffuser extending and expanding in cross-section between said inlet portion and said outlet portion, and a linear thermal expansion portion at said inlet portion consisting of a gap (A) between said inner element and said coolant tube to allow for thermal expansion of said coolant tube and said inner element when in the presence of heated process gas, said gap (A) effective to avoid both inner element contact with said coolant tube and formation of eddies, and wherein said outlet fitting is configured to pass said heated process gas from said double-pipe heat exchanger to an outlet pipe.

\* \* \* \* \*